United States Patent [19]
Spengler et al.

[11] Patent Number: 5,636,027
[45] Date of Patent: Jun. 3, 1997

[54] APPARATUS FOR MAKING CONTACTLESS MEASUREMENTS OF THE THICKNESS OF AN OBJECT MADE OF TRANSPARENT MATERIAL

[75] Inventors: Stefan Spengler, Budenheim; Dieter Munkes, Langenlonsheim; Georg Sparschuh, Aspisheim, all of Germany

[73] Assignee: Schott Glaswerke, Mainz, Germany

[21] Appl. No.: 533,059

[22] Filed: Sep. 25, 1995

[30] Foreign Application Priority Data

Sep. 29, 1994 [DE] Germany .......................... 44 34 822.3

[51] Int. Cl.⁶ ...................................................... G01B 11/06
[52] U.S. Cl. ........................................ 356/382; 250/559.28
[58] Field of Search ................................. 356/351, 382; 250/559.27, 559.28

[56] References Cited

U.S. PATENT DOCUMENTS

| 3,523,736 | 8/1970 | Bottomley . | |
|---|---|---|---|
| 4,902,902 | 2/1990 | Tole | 356/382 |

FOREIGN PATENT DOCUMENTS

| 0248552 | 12/1987 | European Pat. Off. . |
| 4143186 | 7/1993 | Germany . |

*Primary Examiner*—Richard A. Rosenberger
*Attorney, Agent, or Firm*—Walter Ottesen

[57] ABSTRACT

The invention relates to an apparatus intended especially for making a contactless measurement of the thickness of measurement objects made of transparent material. In the course of this measurement, two opposing beams produced by a first and second radiation source are directed through first and second beam splitters and through a deflecting device consisting of a body of transparent material having reflecting and refracting boundary surfaces. Thereafter, the beams are directed obliquely onto the surface of the object to be measured. The first and second component beams are reflected off the forward and rearward surfaces, respectively, of the object and are directed through first and second beam splitters onto first and second detecting devices. In order to facilitate a compact configuration and higher measurement precision, the first and second beam splitters define the incidence surfaces of the deflecting device facing towards the radiation sources.

9 Claims, 1 Drawing Sheet

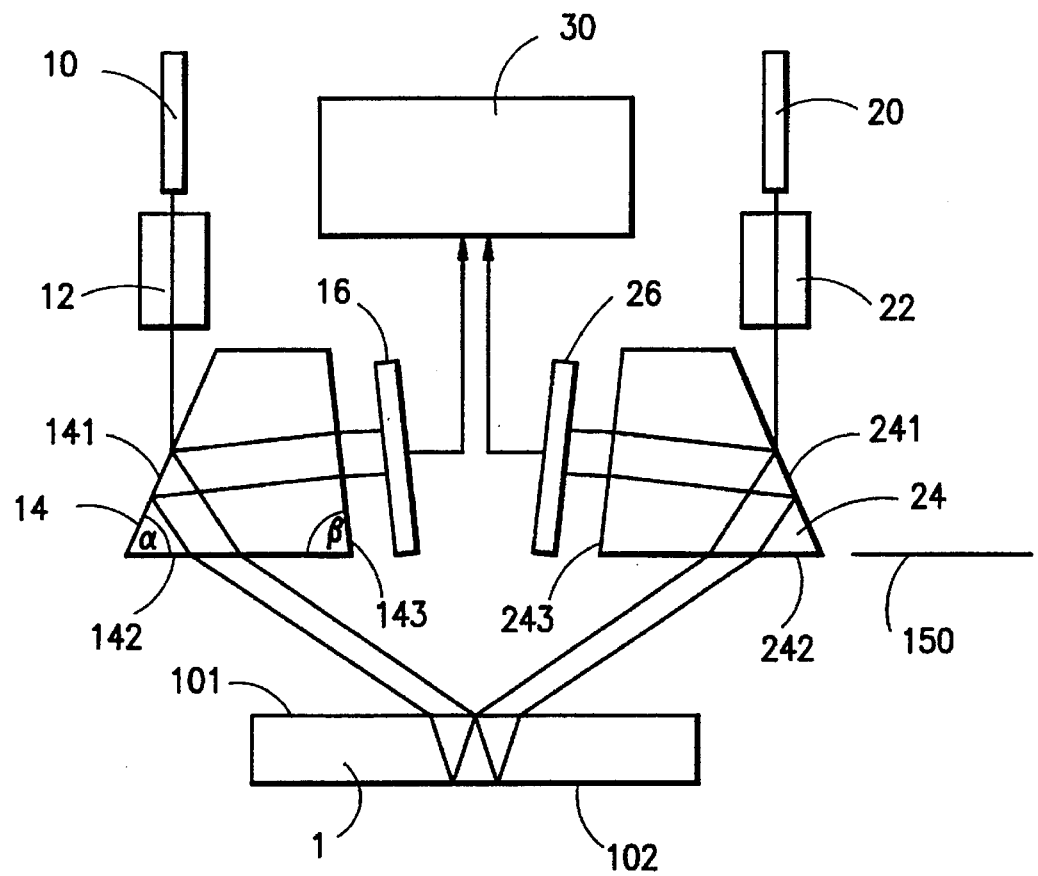
FIG. 1
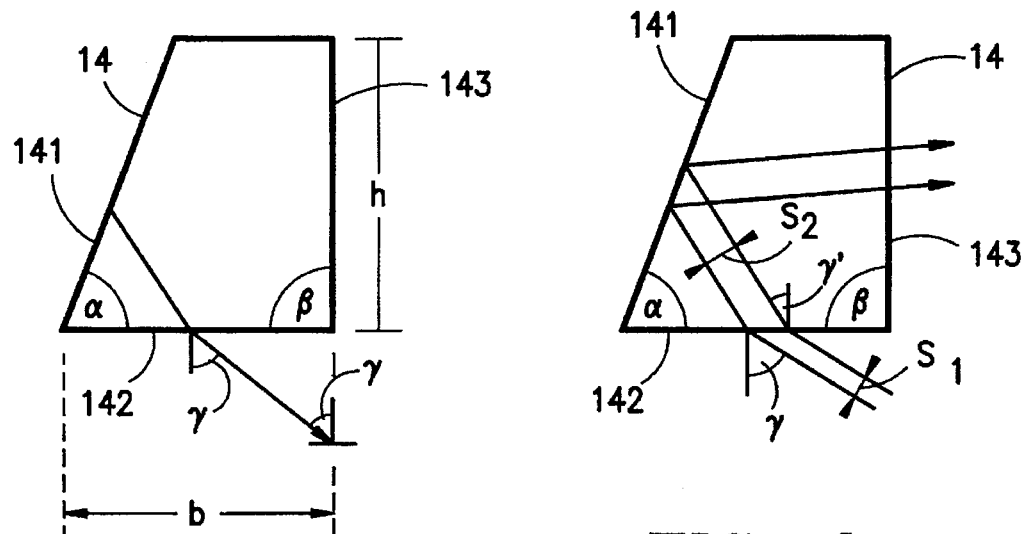
FIG. 2
FIG. 3

APPARATUS FOR MAKING CONTACTLESS MEASUREMENTS OF THE THICKNESS OF AN OBJECT MADE OF TRANSPARENT MATERIAL

FIELD OF THE INVENTION

The invention relates to an apparatus especially for making contactless measurements of the thickness of objects made of transparent material. In the apparatus, two opposing beams coming from first and second radiation sources are directed through first and second beam splitters and through a deflecting device. The deflecting device is made of a body of transparent material and has reflecting and refractive boundary surfaces. The two opposing beams pass through the deflecting device and are directed obliquely onto the surface of the object to be measured which is referred to hereinafter as the measurement object. The first and second component beam pairs are, in turn, reflected at the forward and rearward surfaces of the measurement object and are again directed through the deflecting device and through the first and second beam splitters onto first and second detecting devices.

BACKGROUND OF THE INVENTION

The procedure of directing a laser beam obliquely onto the surface of a glass plate in order to determine its thickness is known, for example, from European patent publication 0,248,552. The laser beam is partially reflected at the glass plate and partially refracted into the same. The refracted component is then partially reflected at the rearward surface of the glass plate. The component reflected at the rearward surface then hits the forward surface again and is refracted out of the glass. In the case of the forward and rearward surfaces being plane parallel to each other, the beam is displaced parallelly to the component beam which was reflected directly at the forward surface. The spacing between the two component beams is directly proportional to the thickness of the glass when the angle of incidence on the surface of the glass and the glass refractive index are constant.

The necessary oblique incidence of the laser beam on the surface of the measurement object is achieved in the state of the art, as a rule, by an oblique setting of the laser or by means of one or more mirrors or by means of a deflecting prism.

An arrangement of the above type is disclosed in German patent publication 4,143,186. The arrangement described in this document operates with two opposing beam paths in order to compensate measurement errors that can, for instance, occur if the measurement object is tilted. The known arrangement includes two laser light sources, two beam splitters, two linear sensors and a deflecting prism. The opposing beam paths are provided in that the optical components described above are symmetrically arranged on the deflecting prism in such a way that the symmetry axis of the prism defines the symmetry axis of the entire arrangement.

The disadvantage of this arrangement is that every measurement beam must pass through eight glass/air boundary surfaces (beam splitters, deflecting prism) on its path from the source to the detecting device, without counting the surface of the measurement object. This can affect the accuracy of measurement, since the boundary surfaces can easily be contaminated, especially when utilizing such an apparatus in manufacturing plants.

Furthermore, the two beam paths cannot be operated simultaneously, but must be operated alternately, since parasitic reflections would otherwise disturb the measurement. These parasitic reflections are caused by each of the incident beams and, after reflection in the beam splitter, can become superposed on the component beam pairs to be detected.

SUMMARY OF THE INVENTION

It is an object of the invention to provide an arrangement of the kind described above so that even small glass thicknesses can be determined quickly and with high accuracy.

The apparatus of the invention is for making a contactless measurement of a spacing between reflecting forward and rearward boundary surfaces and especially for determining the thickness of a measurement object made of transparent material and defining said reflecting forward and rearward boundary surfaces. The apparatus includes: first and second radiation sources for generating the first and second beams; first and second beam deflecting devices made of transparent material; first and second position-resolving detectors mounted adjacent corresponding ones of the beam deflecting devices; the first deflecting device defining a first surface facing toward the first radiation source and the second deflecting device defining a second surface facing toward the second radiation source; the first surface conjointly defining a beam entry and a splitting surface causing the first beam to split at the first surface to form a first component beam that enters the first deflecting device at the first surface and is directed along a first beam path toward the measurement object; the second surface conjointly defining a beam entry and a splitting surface causing the second beam to split at the second surface to form a second component beam that enters the second deflecting device at the second surface and is directed along a second beam path toward the measurement object; the first and second deflecting devices being positioned relative to each other so as to cause the first and second component beams to define first and second beam paths which run toward each other and impinge inclined at the forward boundary surface whereat:

(a) radiation of the first component beam is reflected at both of the boundary surfaces toward and into the second deflecting device along and in the direction of the second component beam path up to the second surface whereat the radiation of the first component beam is decoupled from the second component beam and reflected toward the second position-resolving detector; and, (b) radiation of the second component beam is reflected at both of the boundary surfaces toward and into the first deflecting device along and in the direction of the first beam path up to the first surface whereat the radiation of the second component beam is decoupled from the first component beam and reflected toward the first position-resolving detector.

The deflecting device is configured of a body of transparent material and has refracting and reflecting boundary surfaces that are used to deflect beams. The invention is based upon the idea that this deflecting device can be configured such that its boundary surfaces can be used as first and second beam splitters. The apparatus according to the invention, in contrast to the state of the art, does not require beam splitters.

There are many possibilities to realize a deflecting device of the kind described above. A person knowledgeable in geometric optics will be able to find an embodiment of the deflection device suited for the desired purpose without difficulty since the beam paths are for the most part given.

A suitable embodiment could, for instance, be a deflecting prism of the kind described in German patent publication 4,143,186 which is so dimensioned that the beams reflecting back from the measurement object do not exit from the prism via the side walls as shown in this publication, but are reflected at the side walls toward the upper base surface on which the detecting devices are mounted. The lasers must be suitably directed toward the side surfaces of the deflecting prism. These side surfaces of the deflecting prism define the beam splitters in this embodiment of the invention as described below.

Preferably, the invention is realized by configuring the deflecting device as two identical prisms, which are positioned symmetrically to the symmetry axis of the apparatus to obtain opposing beam paths. Each of the prisms is so configured that the beam entry surface facing toward the radiation source corresponding thereto is at the same time reflection surface for the component beams of the other laser beam reflecting at the measurement object. In other words, the component beams are reflected by this boundary surface (reflecting surface) toward the detecting device. This boundary surface is thus not only part of the beam deflection device but also functions as a beam splitter at the same time.

BRIEF DESCRIPTION OF THE DRAWINGS

The invention will now be described with reference to the drawings wherein:

FIG. 1 is a schematic of the overall configuration of a measuring apparatus according to the invention;

FIG. 2 is a schematic of the beam path of the incident beam in the prism coming from the radiation source; and, FIG. 3 is analog to FIG. 2 and shows the beam path of the reflected component beams in the prism.

DESCRIPTION OF THE PREFERRED EMBODIMENTS OF THE INVENTION

In FIG. 1, the measurement object, for instance, a glass plate having a thickness, or a glass tube having a wall thickness to be measured, is identified by reference numeral 1. Reference numerals 10 and 20 identify the first and second radiation sources, lasers in this case. Reference numerals 12 and 22 identify beam converters to perform the task of giving the beam cross section a desired form and of changing the polarization direction of the beams if required. Reference numerals 14 and 24 identify the two prisms. Each of the prisms defines a deflecting device and the beam splitter. Reference numerals 16 and 26 identify the associated detecting devices for the reflected component beams, which are linear sensors in the embodiment shown. The measurement signals from the linear sensors 16 and 26 are supplied to an electronics evaluation unit 30 for evaluation.

The overall configuration is mirror symmetric to a symmetry axis extending in the plane of the drawing between the two prisms 14 and 24. This results from the requirement for an opposing beam guidance which is intended to compensate measuring errors caused by tilting of the measurement object. In this connection, reference can be made to German patent publication 4,143,186 wherein this measuring principle is described in detail.

During operation, beams from the radiation sources 10 and 20 pass through the beam converters 12 and 22 and then impinge on the outer surfaces 141 and 241, respectively, of the prisms 14 and 24. At these boundary surfaces (141, 241), a component of the radiation is reflected, the larger component is refracted and enters the particular prism. At the boundary surface 142 or 242 of the prism, the beam is again in part reflected and in part refracted. The refracted component of the beam exits the prism and impinges upon the measurement object. Advantageously, the prism is configured such that the reflected component beam stays in the prism and does not appear as parasitic reflections, as is explained further below.

For the sake of clarity, the beam path in the prism on the way toward the object to be measured is shown in the schematic of FIG. 2 without the opposing component beams of the other beam path backreflected from the object 1. Like FIG. 2, FIG. 3 shows only the prism 14 shown on the left side of FIG. 1. Because of the symmetry of configuration, the beam path is identical in both prisms.

FIG. 3 shows the beam paths of the backreflected component beams in the prism. The backreflected component beams are reflected at the forward and rearward surfaces (101, 102) of the measurement object 1 and arrive at surface 142 of the prism 14. A part of each component beam is again reflected at the surface 142 and the unreflected portion of each component beam enters the prism 14 and these beams are refracted as shown. After transversing the prism 14, the refracted component beams are reflected at the surface 141 in the direction of the surface 143. At the surface 143, the component beam pair leaves the prism 14 and reaches the linear sensor 16. The measurement signals are evaluated by means of the electronic evaluation unit 30 connected to the linear sensor 16 and converted to spacing values.

The evaluation of the measurement signals is state of the art and is described in European patent publication 0,248, 552, for example. The evaluation is performed essentially using the formula:

$$T = s \cdot \frac{\sqrt{n^2 - \sin^2\gamma}}{\sin(2\gamma)}$$

wherein: s is the spacing between the component beams of a beam pair, n is the refractive index of the glass of the object being measured, T is the thickness of the object being measured and $\gamma$ is the angle of incidence of the beam pair on the object being measured. In dependence upon the implemented electronics, it may be necessary to insert correction factors into the evaluation formula.

Position sensitive photodiodes or diode detectors, which are arranged in a row, for example, are appropriate detecting devices (16, 26) and are referred to herein as linear sensors.

Preferably, linear sensors are used because they are robust, have a high resolution, are compact, geometrically stable, cost effective and easily evaluated.

FIGS. 1 to 3 show that the outer surfaces (141, 241) of the prisms (14, 24) not only serve to deflect beams, but also to split them. The incident beams coming from the radiation sources 10 and 20 are refracted into the prisms 14 and 24, respectively, when impinging on respective outer surfaces (141, 241). The backreflected component beams, on the other hand, are reflected at the surfaces (141, 241) in the direction of the linear sensors (16, 26). This means that the surfaces (141, 241) have a beam splitting characteristic. For this purpose, it is sufficient that the surfaces (141, 241) are partially transmissible for radiation. As a rule, this is the case for all boundary surfaces between air and an object consisting of a material transparent for the particular radiation.

A splitting of the beams is necessary because the beam paths oppose each other. More specifically, the radiation backreflected from the measurement object, which is in part superposed on radiation emitted by the other radiation source and running to the measurement object, must be decoupled from this other radiation and be deflected towards the detecting device. The arrangement disclosed in German patent publication 4,143,186 includes separate optical components, namely, beam splitters for this purpose. According to the invention, these separate components are not needed and this contributes to the advantages described above.

The dimensioning of the prisms 14 and 24 depends upon the particular application. A person knowledgeable in the field can easily determine the dimensions most appropriate for a particular purpose. In order to be able to do this, the person must merely be knowledgeable in basic geometric optics and see that the beam path shown in FIG. 1 is essentially realized. The procedure of dimensioning the prisms normally takes place in the following way. The person knowledgeable in the field selects the dimensions so that the angle γ of incidence of the beam directed toward the surface of the measurement object lies approximately between 20° and 70°. This establishes a compromise between the greatest possible beam spacing separating the backreflecting component beams, on the one hand, and the limitation of the transverse expansion of the measurement area in the measurement object, which is relevant mainly in thick objects. Further, the geometry of the prisms 14 and 24 can be selected by setting an appropriate angle β for otherwise given dimensions, so that parasitic reflections stay inside the prism due to total reflection at the side walls (143, 243). The parasitic reflections can, for instance, occur when rays of radiation running toward the object reflect off the base surfaces of the prisms facing toward the measurement object. If the parasitic reflections would not stay inside the prism, they would reach the linear sensors and generate further signals which would complicate the evaluation and worsen the signal/noise ratio.

Apart from achieving a high precision of measurement, rendering these parasitic reflections ineffective affords the advantage that, in contrast to the apparatus mentioned in German patent publication 4,143,186, both beam paths can be used simultaneously. The previously described effect of the beam paths which occurs in the known devices does not occur in the apparatus of the invention.

Advantageously, the component beam pairs reflected off the measurement object are directed perpendicularly onto the surfaces (143, 243) after reflection at the respective boundary surfaces (141, 241) of the respective prisms 14 and 24. For simplicity, this takes place preferably by adjusting the angle β of the prisms. In the instance of a perpendicular pass through the surfaces (143, 243), the prism operates as an anamorphic expansion or magnification system, as can be seen in FIG. 3; that is, the spacing $s_1$ of the two component beams, which are reflected at forward and rearward surfaces (102, 102) of the measurement object 1, is increased to $s_2$ by the prism. Since the component beams reach the linear sensors (16, 26) directly upon leaving the prisms, the increased spacing is preserved when the measurement signals are processed. The magnification factor V is given from FIG. 3 as follows:

$$V = \frac{s_2}{s_1} = \frac{\cos \gamma'}{\cos \gamma}$$

The advantage is that, for small thicknesses, intensity distributions of reflections can be separated again. These intensity distributions from the forward and rearward surfaces would, without magnification, be superposed upon each other. In this way, glasses with a small thickness can still be measured which would no longer be possible without the magnification.

In a preferred embodiment of the invention, the linear sensors are cemented directly on the boundary surfaces (143, 243) of the prisms (14, 24). Preferably, an absorption or interference filter, particularly one consisting of a dielectric layer system, is placed between the boundary surfaces and the linear sensors in order to eliminate impinging radiation from the ambient. This can be done, for example, by cementing the filter between the boundary surfaces and the linear sensors. It has been proven especially successful to use a colored glass filter RG 645, which suppresses short-wave radiation up to 645 nm. In this way, all glass surfaces are optically inactive, cannot be contaminated, and no specific requirements must be made with respect to planeness and polishing quality.

High intensities can be achieved for the component beams to be detected by a beam splitting coating on the surfaces (141, 241) which sets the ratio of reflected to transmitted radiation to approximately 1:1 between reflected and transmitted beams. An anti-reflection coating on the surfaces (143, 243) will, for the most part, prevent the formation of the parasitic reflections described above.

With respect to the above, preferred materials and preferred dimensions have been determined for the component prisms. These dimensions, as well as the angle γ achieved thereby, are listed in the table below:

| Angle γ | Angle α | Angle β | h | b | Glass type |
|---|---|---|---|---|---|
| 49° | 61.17° | 85.70° | 65 mm | 60 mm | BaF 52 |
| 30° | 55.40° | 90° | 60 mm | 68 mm | FK 54 |
| 25° | 48.70° | 100° | 60 mm | 65 mm | FK 54 |

The angle γ in the table above refers to the angle between the beam leaving the prism (14, 24) in the direction toward the measurement object 1 and the surface normal of the corresponding surfaces (142, 242), or between the surface normal of the measurement object and the beam heading thereto.

Large angles γ are especially suited for measurement of small glass thicknesses, whereby small working spaces are accepted.

On the other hand, small angles γ are especially advantageous when measuring larger glass thicknesses and when large working spacings are desired.

The angle γ (and thereby the angle α of the prism) is determinative of precision. The angle β, in comparison, is relatively noncritical since the sine of the angle determining the refraction changes by only 0.01% if the perpendicular passage through the surfaces (143, 243) deviates by ±1°. According to laws of refraction, this causes only a very minute deflection of the beam.

The advantages of the apparatus according to the invention are summarized below.

By including several functions in one component, namely, beam splitting and beam deflecting in one prism, the apparatus according to the invention is compact and inexpensively manufactured. Separate beam splitters are not required. Furthermore, the apparatus according to the invention requires few or no dielectric coatings. In contrast to the solution found in German patent publication 4,143,186, in which eight boundary surfaces between glass and air must be overcome and treated to reduce reflection (not including the object being measured), the configuration shown in FIG. 1 only requires that four glass/air boundary surfaces be considered.

The angles of the prisms can be chosen such that parasitic reflections (which cannot be completely excluded even after the surfaces have been treated to reduce reflections) cannot influence the measurements in the other beam path. Thus, it is possible to evaluate both beam paths simultaneously which, in turn, increases the rate of measurements.

The apparatus according to the invention is characterized by a simple adjustment because only the two optical axes of the lasers must be set parallel to each other and perpendicularly aligned to the forward edge of the apparatus which, at the same time, is the reference edge for the prisms. The reference edge is represented schematically in FIG. 1 by line 150. If the angle α of the prisms is made very precisely, one can assume that the angles of incidence on the measurement object are automatically the same for both beam paths provided that the prisms with the surfaces (142, 242) are positioned on the reference edge.

The apparatus according to the invention is suited for a variety of applications: in addition to the thickness measurements of sheet glass, the measurement of wall thicknesses of glass tubes is of interest. For thin tubes, the apparatus of the invention is provided with appropriate dimensions and the wall thicknesses as well as the inner and outer diameters thereof can be determined. In the process of measurement, two reflection pairs are obtained having a certain spacing from each other and which correspond to the reflection of the beams at the forward and rearward walls of the tube. The outer diameter corresponds to the spacing between the first and the fourth reflections (with respect to the zero point of the measurement scale). The inner diameter corresponds to the distance between the second and third reflections. Furthermore, spacing and planar measurements could also be made for opaque objects, reflecting mainly in one direction. For these objects, the distance of the first reflections to a reference point on the measurement scale is of importance.

It is understood that the foregoing description is that of the preferred embodiments of the invention and that various changes and modifications may be made thereto without departing from the spirit and scope of the invention as defined in the appended claims.

What is claimed is:

1. An apparatus for making a contactless measurement of a spacing between reflecting forward and rearward boundary surfaces and especially for determining the thickness of a measurement object made of transparent material and defining said reflecting forward and rearward boundary surfaces, the apparatus comprising:

first and second radiation sources for generating said first and second beams;

first and second beam deflecting devices made of transparent material;

first and second position-resolving detectors mounted adjacent corresponding ones of said beam deflecting devices;

said first deflecting device defining a first surface facing toward said first radiation source and said second deflecting device defining a second surface facing toward said second radiation source;

said first surface conjointly defining a beam entry and a splitting surface causing said first beam to split at said first surface to form a first component beam that enters said first deflecting device at said first surface and is directed along a first beam path toward the measurement object;

said second surface conjointly defining a beam entry and a splitting surface causing said second beam to split at said second surface to form a second component beam that enters said second deflecting device at said second surface and is directed along a second beam path toward the measurement object;

said first and second deflecting devices being positioned relative to each other so as to cause said first and second component beams to define first and second beam paths which run toward each other and impinge inclined at said forward boundary surface whereat:

(a) radiation of said first component beam is reflected at both of the boundary surfaces toward and into said second deflecting device along and in the direction of said second component beam path up to said second surface whereat said radiation of said first component beam is decoupled from said second component beam and reflected toward said second position-resolving detector; and, (b) radiation of said second component beam is reflected at both of the boundary surfaces toward and into said first deflecting device along and in the direction of said first beam path up to said first surface whereat said radiation of said second component beam is decoupled from said first component beam and reflected toward said first position-resolving detector.

2. The apparatus of claim 1, said deflecting devices being first and second prisms arranged symmetrically relative to each other.

3. The apparatus of claim 2, said first and second surfaces of said prisms being provided with a beam-splitting coating; and, said first and second prisms having third and fourth surfaces, respectively, facing toward said measurement object; and, said third and fourth surfaces being provided with an antireflective coating.

4. The apparatus of claim 3, wherein said first and second component beams pass toward said measurement object through said third and fourth surfaces, respectively; said first prisms being so dimensioned that said first component beam defines an exiting angle γ between 20° to 70°; and, said second prism being so dimensioned that said second component beam likewise defines an exiting angle γ between 20° to 70°.

5. The apparatus of claim 4, wherein said first prism has a fifth surface through which said radiation of said second component beam passes to said first detector; said second prism has a sixth surface through which said radiation of said first component beam passes to said second detector; said third and fifth surfaces conjointly defining a first angle β1 and said fourth and sixth surfaces likewise defining a second angle β2, said first angle β1 being so selected that said radiation of said second component beam passes perpendicularly through said fifth surface to said first detector; and, said second angle β2 being so selected that said radiation of said first component beam passes perpendicularly through said sixth surface to said second detector.

6. The apparatus of claim 5, wherein said first angle β1 is so selected that parasitic radiation within said first prism is totally reflected within said first prism; and, said second angle β2 is so selected that parasitic radiation within said second prism is totally reflected within said second prism.

7. The apparatus of claim 6, wherein said first detector is a linear detector cemented to said fifth surface; and, said second detector is a linear detector cemented to said sixth surface.

8. The apparatus of claim 6, further comprising a first absorption or interference filter interposed between said fifth surface and said first detector; and, a second absorption or interference filter interposed between said sixth surface and said second detector.

9. The apparatus of claim 6, said first and second prisms have the following dimensions for particular glass types:

| $\alpha1 = \alpha2$ | $\beta1 = \beta2$ | h | b | Glass Type |
|---|---|---|---|---|
| 61.17° | 85.70° | 65 mm | 60 mm | BaF 52 |
| 55.40° | 90° | 60 mm | 68 mm | FK 54 |
| 48.70° | 100° | 60 mm | 65 mm | FK 54 | wherein:

b is the length of said third and fourth surfaces;

h is the height of said prisms measured from said third and fourth surfaces, respectively;

$\alpha1$ is conjointly defined by said first and third surfaces of said first prism; and, $\alpha2$ is conjointly defined by said second and fourth surfaces of said second prism.

* * * * *